(12) United States Patent
Chesley et al.

(10) Patent No.: US 6,795,093 B1
(45) Date of Patent: Sep. 21, 2004

(54) SCRIPTED TEXT DISCUSSION SYSTEM

(75) Inventors: Harry R. Chesley, San Francisco, CA (US); Lili Cheng, Bellevue, WA (US); Suzana Seban, San Francisco, CA (US); Jennifer Landau, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 09/686,328

(22) Filed: Oct. 11, 2000

(51) Int. Cl.[7] .................................................. G09G 5/00
(52) U.S. Cl. ........................ 345/751; 345/733; 345/753; 345/755; 345/758
(58) Field of Search ................................ 345/753, 758, 345/733, 751, 755, 759; 709/204–206; 707/101

(56) References Cited

U.S. PATENT DOCUMENTS

| | | | | |
|---|---|---|---|---|
| 5,828,839 A | * | 10/1998 | Moncreiff | 709/204 |
| 6,360,252 B1 | * | 3/2002 | Rudy et al. | 709/206 |
| 6,385,620 B1 | * | 5/2002 | Kurzius et al. | 707/104.1 |
| 6,393,412 B1 | * | 5/2002 | Deep | 705/400 |
| 6,425,012 B1 | * | 7/2002 | Trovato et al. | 709/227 |
| 6,431,875 B1 | * | 8/2002 | Elliott et al. | 434/322 |
| 6,525,747 B1 | * | 2/2003 | Bezos | 345/751 |

* cited by examiner

Primary Examiner—Kristine Kincaid
Assistant Examiner—Gary Nguyen
(74) Attorney, Agent, or Firm—Microsoft Corporation (57) ABSTRACT

A text discussion script data structure is stored on a computer-readable medium in association with a real-time computer discussion. The text discussion script data structure is specified by an author to guide a real-time, multi-user, text discussion or "chat." The text discussion script includes one or more successive scenes having roles for each of one or more discussion participants. For each scene and role, the author provides instructions and background information that guide the discussion participants, but do not provide the explicit text of the real-time discussion. Accordingly, the text discussion script is adapted to guide real-time computer discussions or chats in a scalable, replicable way, while allowing participants to generate the actual discussion dialog. The text discussion script data structure may be specified by markup language tags that, together, form a markup language tag schema.

12 Claims, 5 Drawing Sheets

SCRIPTED TEXT DISCUSSION SYSTEM

FIELD OF THE INVENTION

The present invention relates to real-time computer discussion or chat systems and, in particular, to such a system with structured or guided real-time text discussions.

BACKGROUND AND SUMMARY OF THE INVENTION

Conventional real-time computer discussion or chat systems allow users at multiple separate user computers to communicate with each other substantially simultaneously in real-time. For example, each user is free to enter text messages into the discussion system. A central computer system receives the messages or turns and broadcasts them to each of the participating user computers. The text messages are displayed on a display screen associated with each user computer as a common sequence and set of messages, thereby allowing all users to communicate with each other simultaneously.

Many conventional chat systems include a general topic or title for a chat session or "room," but the general topic is typically very broad and the discussion that actually occurs is often unrelated to the broad topic. Even for discussions that stay within the general topic, the particular discussion is often controlled by one or two active participants or several unrelated discussions can occur at the same time. As a consequence, chat sessions in many conventional chat systems can range from chaotic to non-topical and can be unsatisfying for many participants.

To overcome some of these disadvantages, some chat systems include moderators or hosts as discussion participants who have added authority or control to guide chat sessions. A disadvantage of chat session hosts is that every chat session would require a separate person to moderate it. With the immense numbers of chat systems that are operating simultaneously, hosted chat sessions are not practicable for widespread use.

The present invention is an application of a real-time computer discussion system having a central computer system with which each of multiple participant computers are in communication, such that messages are transmitted among the participant computers as substantially real-time messages of a discussion between the participants. In one implementation, the invention includes a text discussion script data structure that is stored on a computer-readable medium in association with a real-time computer discussion. The text discussion script data structure is specified by an author to guide a real-time, multi-user, text discussion or "chat." In one implementation, the text discussion script data structure is specified by markup language tags that, together, form a markup language tag schema.

The text discussion script includes one or more successive scenes having roles for each of one or more discussion participants. For each scene and role, the author provides instructions and background information that guide the discussion participants, but do not provide the explicit text of the real-time discussion. Accordingly, the text discussion script is adapted to guide real-time computer discussions or chats in a scalable, replicable way, while allowing participants to generate the actual discussion dialog.

In one implementation, a script introduction includes introductory text that is displayed for users considering participation in a real-time discussion that is guided by the text discussion script. Also, each scene may further include an advancement criterion that is time-based or controlled by one or more of the participants, as specified by the author. The designated participants indicate when they determine a scene to be completed so that the script can proceed to a subsequent scene.

The scripted text discussions provided by the present invention combine a structured, replicable and scalable discussion or chat environment that allows participants to communicate freely. Although analogous to some role-playing games, these scripted text discussions are socially oriented and do not require the involved interaction mechanisms (e.g., combat rules) commonly used in role-playing games to resolve player interactions. While suited to conventional recreational text discussion or chat applications, these scripted text discussions can also be used to structure on-line business interactions such as project meetings, to provide multi-user on-line training and team building, and as a platform for experiments in structured social interaction.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
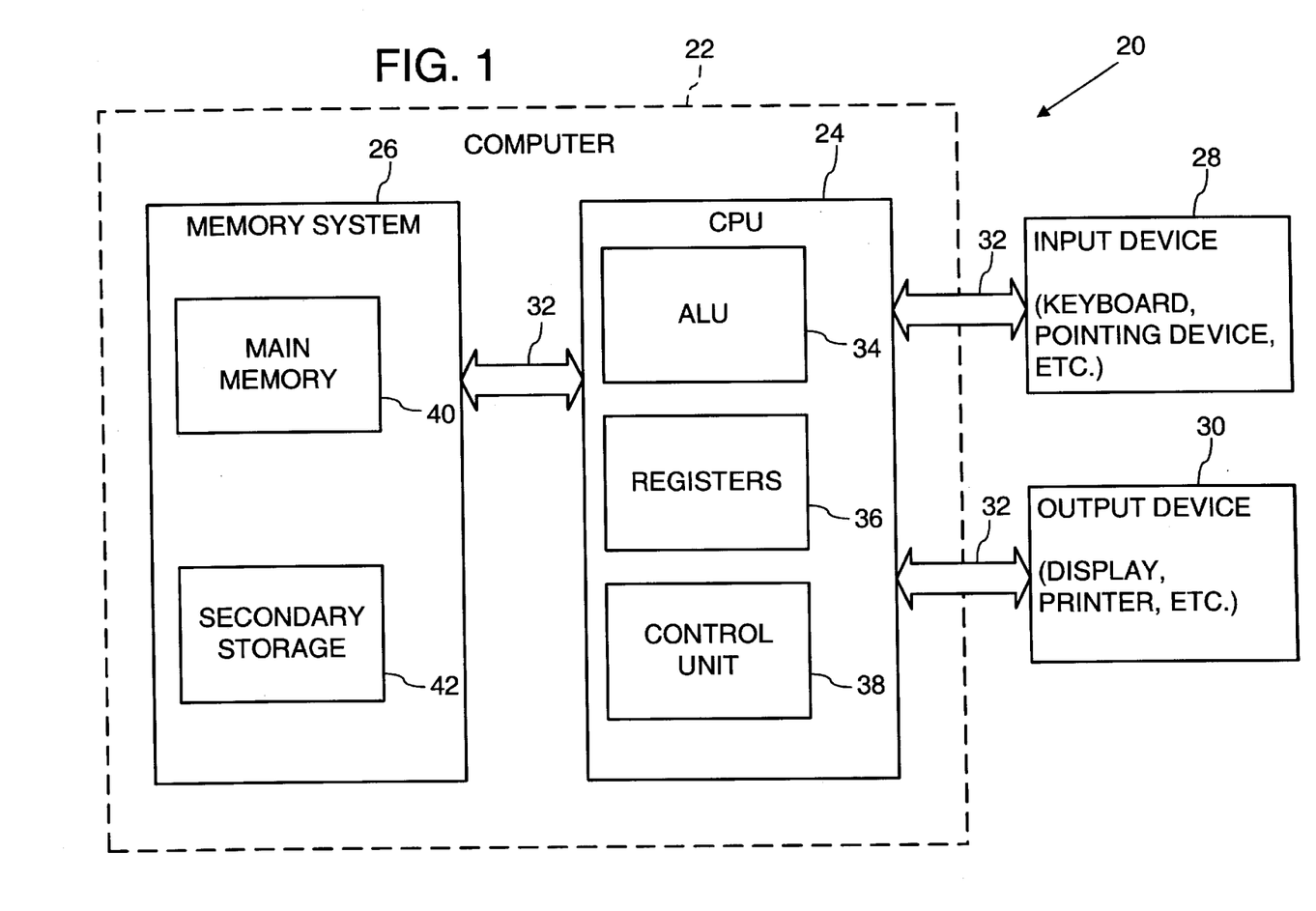
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
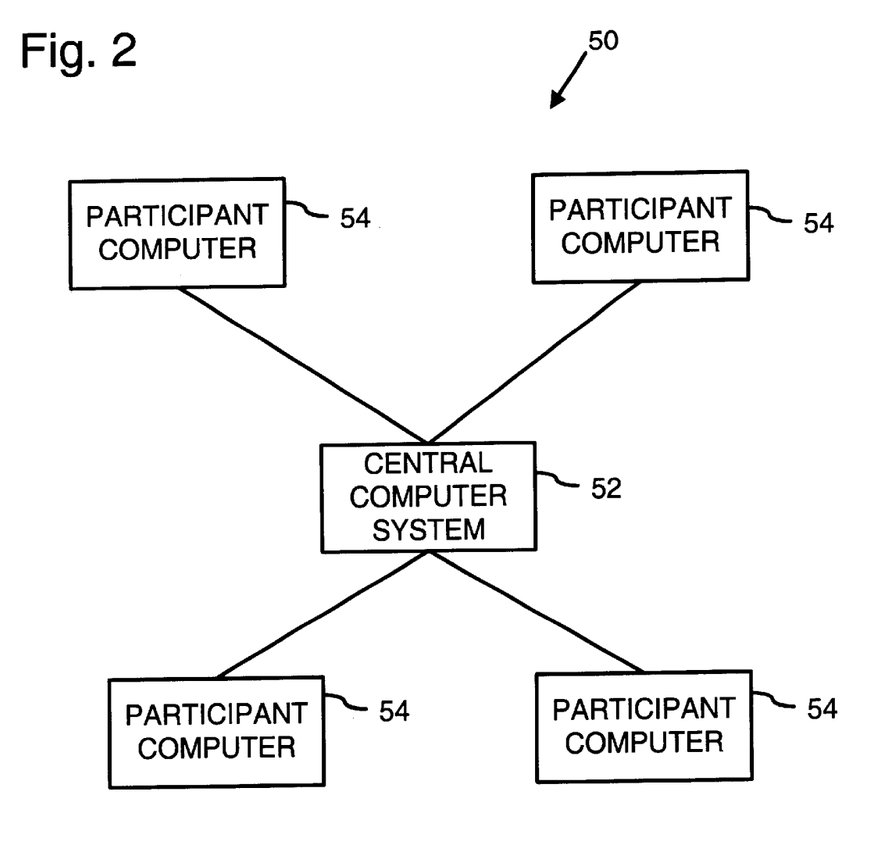
FIG. 2 is a diagram illustrating a real-time computer communication, chat, or discussion system.

FIG. 2 is a diagram illustrating a real-time computer communication, chat, or discussion system 50. Discussion system 50 includes a central computer system 52 in communication with which each of multiple participant computers 54 that are each operated by a participant. The group of participants and participant computers 54 that are in communication with each other may be referred to in a variety of ways. A common metaphor is to refer this group as being in a chat room, room, or discussion.

Commonly, central computer system 52 is a distributed system or interconnected central network of computers with which the multiple participant computers 54 communicate over a computer network (e.g., the Internet). It will be appreciated, however, that discussion system 50 can be implemented in many different ways such as with central computer system 52 being a single computer, with participant computers 54 communicating with central computer system 52 over a local network, etc.

Figure 3:
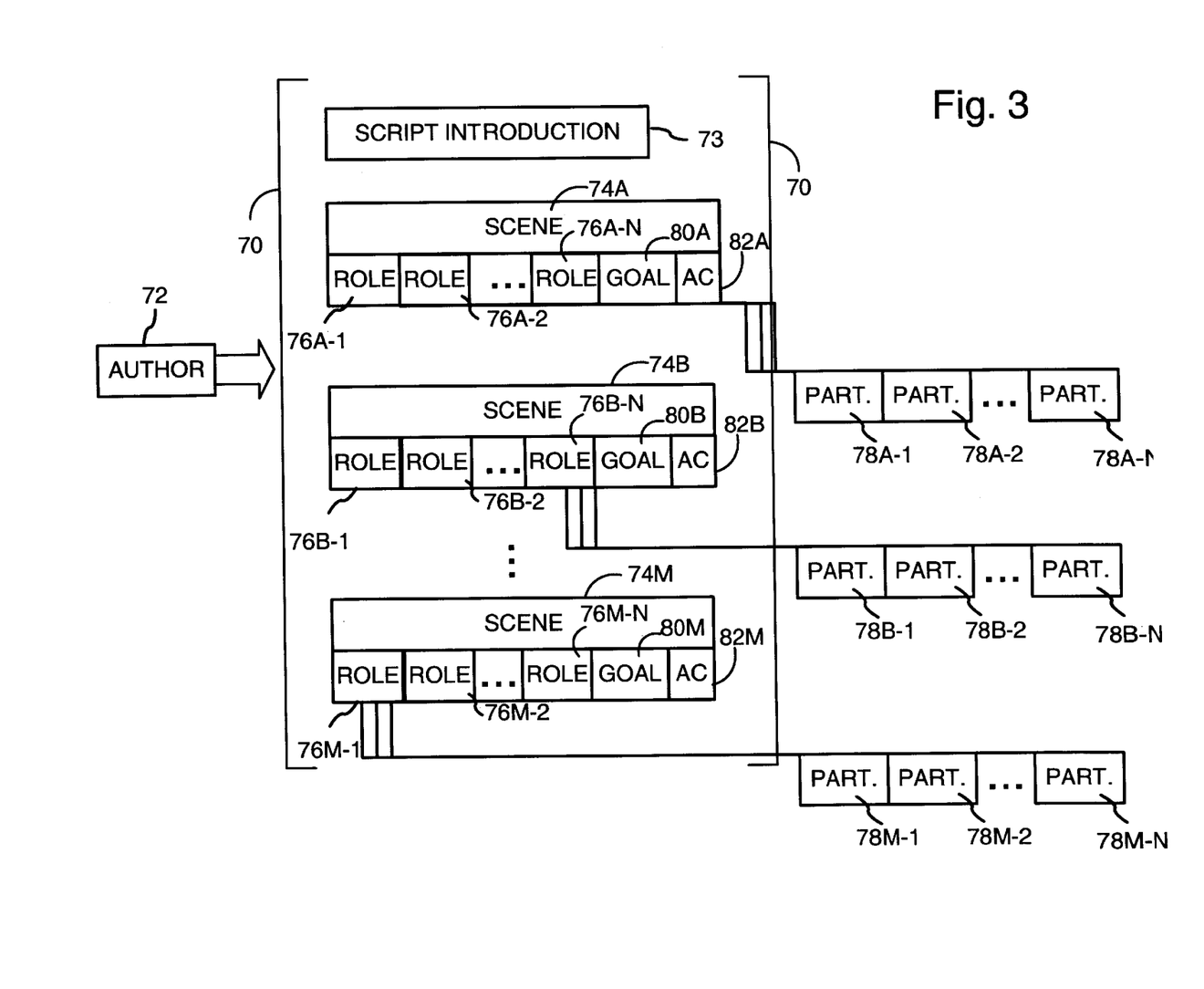
FIG. 3 is a block diagram illustrating a data structure of a text discussion script in accordance with the present invention.

FIG. 3 is a block diagram illustrating a data structure, as stored on a computer readable medium, of a text discussion script 70 in which an author 72 specifies a structure to real-time, multi-user, text discussion or "chat." Text discussion script 70 includes one or more successive scenes 74 having roles 76 for each of one or more discussion participants 78. For each scene 74 and role 76, author 72 provides instructions and background information that guide discussion participants 78, but do not provide the explicit text of the real-time discussion. Accordingly, text discussion script 70 is adapted to guide real-time computer discussions or chats while allowing participants to generate the actual discussion dialog.

A script introduction 73 includes introductory text that is displayed for users considering participation in a real-time discussion or chat guided by text discussion script 70. Typically, script introduction 73 will briefly describe text discussion script 70 and the different roles 76. Users will use this information in order to decide whether to participate in the real-time discussion or chat and what role to choose.

A first scene 74A has multiple roles 76A-1, 76A-2, . . . , 76A-N available for multiple participants 78-1, 78-2, . . . , 78-N. Scene 74A may be expressed by author 72 as instructions and background information that are provided or available to guide any or all of discussion participants 78. Each of roles 76A-1, 76A-2, . . . , 76A-N may be expressed by author 72 as instructions and background information that are separately provided or available to guide participants 78-1, 78-2, . . . , 78-N, respectively. Author 72 can establish a wide range of different situations, where different roles 76 have different, or even conflicting, backgrounds and directions.

Each scene 74 further includes a scene goal 80 and an advancement criterion 82, the latter being time-based or controlled by one or more of participants 78-1, 78-2, . . . , 78-N, as specified by author 72. With scene goal 80, author 72 designates the conditions or circumstances by which one or more of participants 78-1, 78-2, . . . , 78-N are to end a scene 74. In one implementation, author 72 may designate in advancement criterion 80 which of participants 78-1, 78-2, . . . , 78-N, as specified by their roles 76A-1, 76A-2, . . . , 76A-N, shall have authority to determine when a scene 74 is completed. In another implementation, author 72 may designate in advancement criterion 80 a time (e.g., a fixed time duration) when a scene 74 is ended.

Figure 4:
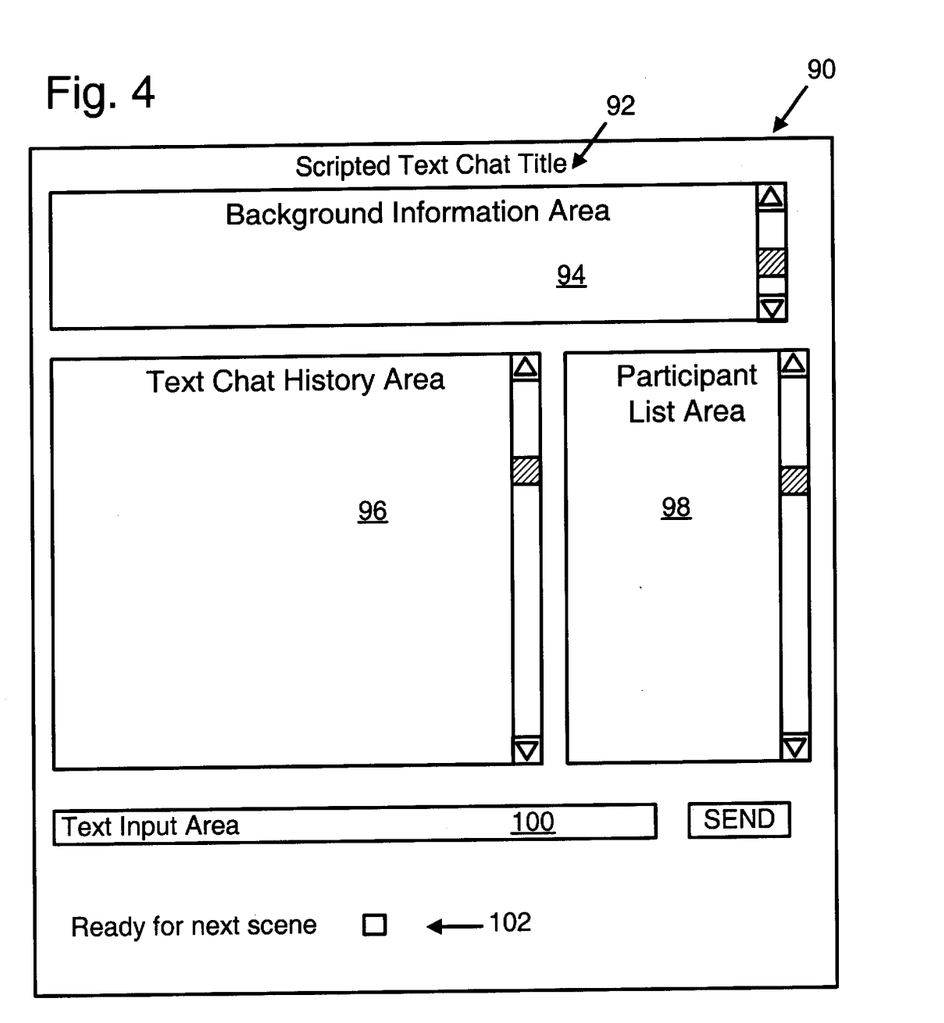
FIG. 4 is a diagrammatic illustration of a scripted text chat user interface window for participating in a scripted text discussion according to the present invention.

FIG. 4 is a diagrammatic illustration of a scripted text chat user interface window 90 for participating in a scripted text discussion or chat according to the present invention. User interface window 90 includes a script title area 92, a background information area 94, a text chat history area 96, a participant list area 98, and a text input area 100. For each scene 74 and role 76, author 72 can provide instructions, background information, and scene advance criteria. The instructions and background information may be displayed in background information area 94 or text chat history area 96.

For each participant 78 that is designated by author 72 as controlling scene advancement, user interface window 90 includes a "Ready for Next Scene" check box 102. Script 70 proceeds to a subsequent scene once when all of a specified set of roles 76 select "Ready for Next Scene" check box 102, or after a fixed amount of time. With each designated participant potentially having a different advancement criterion 80, the conditions for scene advancement can be either simple and concrete or complex and abstract.

Figure 5:
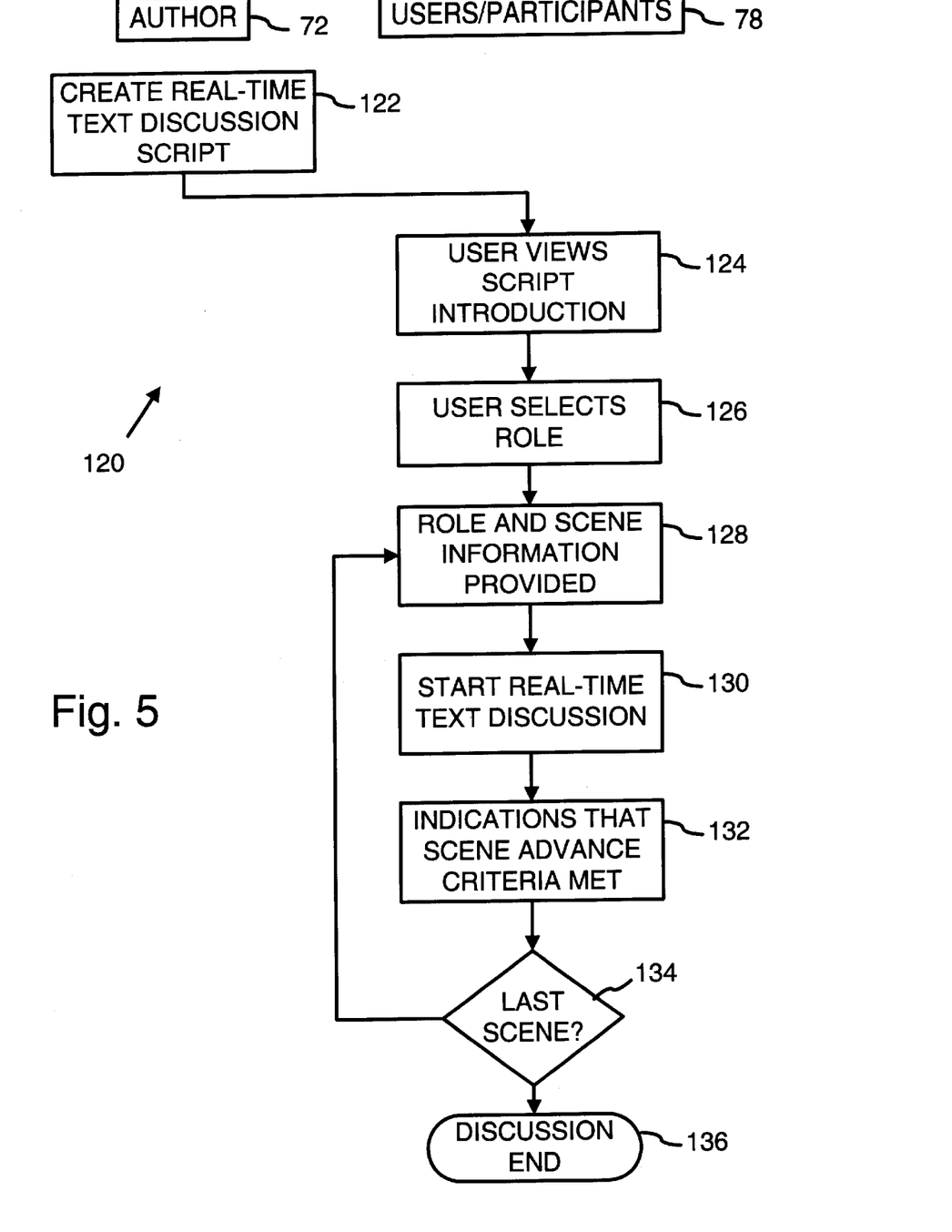
FIG. 5 is a flow diagram illustrating operation of a scripted discussion software process.

FIG. 5 is a flow diagram illustrating operation of a scripted discussion software process 120 that in one implementation operates with graphical user interface 90. Scripted discussion software process 120 is performed by central computer system 52 and user computers 54 in accordance with software instructions stored on computer readable media.

Process block 122 indicates that an author 72 creates a real-time text discussion script 70 for guiding an online, real-time text discussion or chat.

Process block 124 indicates that a user considering participation in the real-time discussion or chat views a script introduction 73. Typically, script introduction 73 includes introductory text that briefly describes text discussion script 70 and the different roles 76.

Process block 126 indicates that each user selects a role 76 and thereby becomes a participant in the discussion or chat.

Process block 128 indicates that scene and role information for a current scene are provided to the participants.

Process block 130 indicates that the real-time text discussion or chat begins based upon the scene and role information provided to the participants, but with the participants otherwise creating the dialog text they use in the discussion or chat.

Process block 132 indicates that indications are made that the scene advance criteria have been met. For example, the indications may be made by one or more designated participants.

Inquiry block 134 represents an inquiry as to whether the current scene is the final scene in the script. Whenever the current scene is not the final scene, inquiry block returns to process block 128 for the next successive scene. Otherwise, inquiry block proceeds to termination block 136.

Components or fields in text discussion script 70 may be represented by markup language tags that together may be referred to generally as a markup language schema, or particularly as a text discussion script schema. In one implementation, the markup language schema is compatible with eXtensible Markup Language (XML). One implementation of text discussion script schema is described below. It will be appreciated, however, that the following implementation is merely exemplary and that a text discussion script 70 of the present invention could be in other alternative ways.

As is common with markup languages, the exemplary text discussion script schema includes both stand-alone tags and paired tags. By convention, the second of a paired set of tags includes the same designator as the first, but also with a leading slash ("l"). In addition, all tags of the exemplary text discussion script schema begin with the letters "ll" (lower case Ls).

<llScript>. . . </llScript>

A text discussion script 70 is designated by paired initiating and ending script tags <llScript>. . . </llScript>, which are located at the respective beginning and end of a script 70. The initiating script tag can include a "min" parameter that sets the minimum number of players for the script, and a "max" parameter that sets the maximum number of players. In one implementation, the default minimum and maximum numbers of players are the sums of the minimum and maximum values for all of the individual roles. It can be useful to set these separately if there are multiple optional roles (with minimums of zero). For example, this can be used to write scripts where there are a number of roles or characters that the user chooses from, but any predetermined number of roles is sufficient for the discussion to proceed.

<llScriptTitle>. . . </llScriptTitle>

Paired initiating and ending script title tags contain the title of the script.

<llScriptIntroduction>. . . <llScriptIntroduction>

Paired initiating and ending script introduction tags contain introductory text that is displayed to the user when considering-whether to participate in the scripted discussion. Typically, the introductory text will briefly describe the discussion and the different roles. Users will use this information in order to decide whether to participate in the script and what role to choose.

<llHelp>. . . </llHelp>

Paired initiating and ending help tags contain help text for one help entry. The initiating help tag includes a "label" parameter that specifies the help entry for which the help is provided. For example, a script may provide help labeled "<role>Help" for each role that may need help or directions; "<title>Introduction" that covers the title as a whole; "<title>Role Summaries" for titles that have multiple roles; and "About <title>" to give the credits and edit history of the title. In one implementation, the help tags are positioned within the script tags, but outside any particular scene.

<llRoleInfo>

A stand-alone role information tag provides information about a given role. For example, the role information tag can be used to specify the order in which roles should appear during role selection, since that process uses the roles in the order they appear in the script. The role information tag can include "min" and "max" parameters that specify the respective minimum and maximum numbers of players required in this role (e.g., default for both is 1). For example, the role information tag may be expressed as:

<llRoleInfo role="Audience" min="0" max="3">

The role information tag may also include a "password" parameter that specifies a password that the user must enter before this role is available. If the password is "foo", the user must type "@password foo" in the lobby for the role to become available for selection by a user. This feature can be used for scripts that require a moderator.

In one implementation, the role information tags are positioned within the script tags, but outside any particular scene.

<llScene>. . . </llScene>

Paired initiating and ending scene tags define and contain a scene within the script. In one implementation, scenes are laid out linearly within the script files, in chronological order. The initiating scene tag can include an advance parameter that establishes the criteria for advancing to the next scene. In one implementation, content of the advance parameter can be:

| CONTENT | ADVANCE TO NEXT SCENE WHEN |
| --- | --- |
| Any | Any of the participating roles votes to do so. |
| all | All of the participating roles votes to do so. |
| n minute | n minutes have passed. |
| n minutes | n minutes have passed. |
| n second | n seconds have passed. |
| n seconds | n seconds have passed. |

The value of the "participants" parameter is a list of the roles that will be a part of the scene advance criteria. For example, if the advance parameter is "all", that means all of the roles listed in the participants parameter must click the next scene checkbox to advance the scene. As with the role parameter, the participants parameter can be a single role name or a list of semi-colon-separated roles. For example, the scene tag may be expressed with a participants parameter as:

<llScene advance="all" participants="Heather; Stuart">

If no participants parameter is supplied, no roles are assumed to participate in advancing to the next scene. This can be useful to prevent a script from proceeding to a standard or default final scene, where all participants are invited to discuss their experiences, and instead the script can end in a scene specified by the author.

<IISceneTitle>. . . </IISceneTitle>

Paired initiating and ending scene title tags define and contain the title of the scene in which these tags occur.

The tags described above relate primarily to the structure of a script, including designations of the scenes within the script. Additional scene information tags may also be provided to provide participants with additional information about each scene. Usually these tags would be contained within a scene tag pair, <IIScene>. . . </IIScene>. In one implementation, scene information tags that occur outside of a particular scene tag pair are applied as the default values for all subsequent scenes in the script.

<IISceneBackground>. . . </IISceneBackground>

Paired initiating and ending scene background tags define and contain optional information that is displayed throughout the scene to the participant having a role that is specified as a tag parameter. The scene background information can give the participant guidance for how to act during the scene. There may be multiple IISceneBackground's for different roles. If the role parameter is not present, then the IISceneBackground is used for all roles. The same thing applies for a IISceneChatEnd tag, which is described next. In one implementation, the scene background information may be maintained in a chat history window 96 (FIG. 4).

<IISceneChatEnd>. . . </IISceneChatEnd>

Paired initiating and ending scene chat end tags define and contain information that is displayed at the end of the scene to the participant with a role that is specified as a tag parameter. In one implementation, the scene chat end information may be maintained in a chat history window 96 (FIG. 4).

<IISceneAdvanceButtonName>. . . </IISceneAdvanceButtonName>

Paired initiating and ending scene advance button name tags define and contain a name of the next scene button for selection by the user or users with the given role to advance from one scene to the next. These tags allow the author to change the name of the scene advance button.

<IISceneChatName>. . .</IISceneChatName>

Paired initiating and ending scene chat name tags define and contain a user's name or alias for use in the text discussion area. In one implementation, the default value is "<IIUserRole>".

<IISceneUserListName>. . . </IISceneUserListName>

Paired initiating and ending scene user list name tags define and contain a user's name in the on-line user list area. In one implementation, the default value is "<IIUserRole><IIReadyToAdvance><IIUserNameIndent>".

In addition to the-scene information tags, other tags may be provided to be used within paired tags other than the scene tag pair, <IIScene>. . . </IIScene>. These other "expanded" tags are expanded when ultimately used, and replaced with the appropriate text at that time. As described below, the tags <IIUserRole>, <IIUserRoleIndent>, <IIUserName>, <IIUserNameIndent>, and <IIReadyToAdvance>are used primarily within the <IISceneChatName>and <IISceneUserListName>tags, and the tags <p>, <br>, >, and &It are used primarily within the <IISceneBackground>and <IISceneChatEnd>tags.

<IIUserRole>

This stand-alone tag is replaced with the user's current role. It is generally used in the IISceneChatName or IISceneUserListName tags.

<IIUserRoleIndent>

This stand-alone tag is replaced with the user's current role on a new line, with indentation. It is generally used in the IISceneUserListName tags.

<IIUserName>

This stand-alone tag is replaced with the user's current name. It is generally used in the IISceneChatName or IISceneUserListName tags.

<IIUserNameIndent>

This tag is replaced with the user's current name on a new line, with indentation. It is generally used in the IISceneUserListName tags.

<IIReadyToAdvance>

This tag is replaced with "(ready)" if the user has clicked on the Ready for Next Scene button; or with nothing if not. It is generally used in the IISceneUserListName tags.

<p>

For the content sections of some tags, the <p>tag can be used to specify paragraph breaks. This is similar to HTML usage of the same tag.

<br>

For the content sections of some tags, the <br>tag can be used to specify line breaks. A line break forces the following text onto a new line, but does not insert an empty line like the <p>tag does. This is similar to HTML usage of the same tag.

&It

The string "&It" is replaced with a less-than symbol ("<"). A less-than symbol within a script will be interpreted as the start of a tag.

>

The string ">" is replaced with a greater-than symbol (">"). A greater-than symbol within a script will be interpreted as the end of a tag.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. In a real-time computer discussion system having a central computer system with which each of multiple participant computers are in communication such that messages are transmitted among the participant computers as substantially real-time messages of a discussion between participants, the system including a computer-readable medium that stores computer software instructions for operating the system, a data structure stored on the computer-readable medium in association with a real-time computer discussion, comprising:

a discussion script field that identifies a predefined real-time text discussion script;

plural predefined scene fields that identify descriptions of plural successive scenes in the real-time text discussion, the plural predefined scene fields identifying descriptions of the plural successive scenes prior to initiation of the real-time computer discussion; and plural role fields are associated with each of the plural predefined scene fields to identify descriptions of plural roles that guide participants in each of the successive scenes of the real time text discussion.

2. The data structure of claim 1 in which at least one of the plural predefined scene fields has associated with it a predefined scene advance criterion field that prior to initiation of the real-time computer discussion describes a criterion upon which a predefined participant can designate advancement of the real-time discussion to a subsequent scene, the predefined participant being identified in the at least one scene field with reference to the role of the participant and corresponding role field.

3. The data structure of claim 1 in which at least one of the plural predefined scene fields has associated with it a predefined scene advance criterion field that prior to initiation of the real-time computer discussion describes a criterion upon which plural predefined participants can designate advancement of the real-time discussion to a subsequent scene, the plural predefined participants being identified in the at least one scene field with reference to the roles of the participants and corresponding role fields.

4. The data structure of claim 1 in which each field is identified by one or more extensible markup language tags.

5. The data structure of claim 1 further comprising a script introduction field having predefined descriptions of the real-time text discussion and different roles in the discussion.

6. In a real-time computer discussion system having a central computer system with which each of multiple participant computers are in communication such that messages are transmitted among the participant computers as substantially real-time messages of a discussion between participants, the system including a computer-readable medium that stores computer software instructions for operating the system, a markup language tag schema stored on the computer-readable medium in association with the real-time computer discussion system, comprising:

a discussion script tag for designating a predefined real-time text discussion script;

a plural predefined scene tag for designating descriptions of plural successive scenes in the real-time text discussion, the plural predefined scene taps identifying descriptions of the plural predefined scenes prior to initiation of the real-time computer discussion; and plural role tags associated with each of the plural predefined scene tags for designating descriptions of plural roles that guide participants in each of the successive scenes of the real-time text discussion.

7. The schema of claim 6 which at least one of the plural predefined scene tags has associated with it a predefined scene advance criterion parameter for describing prior to initiation of the real-time computer discussion a criterion upon which a participant can designate advancement of a real-time discussion from at least one scene to another.

8. The data structure of claim 6 in which at least one of the plural predefined scene tags has associated with it a scene advance criterion parameter for describing prior to initiation of the real-time computer discussion a criterion upon which plural participants can designate advancement of a real-time discussion from one scene to another, the participants being specified according to the roles they assume and the corresponding role fields.

9. In a real-time computer discussion system having a central computer system with which each of multiple participant computers are in communication such that messages are transmitted among the participant computers as substantially real-time messages of a discussion, a method comprising:

successively providing descriptions of plural predefined scenes of a real-time text discussion to each of plural discussion participants, the predefined scenes including plural predefined roles for plural participants in the text discussion, the plural predefined scenes and the plural predefined roles being defined prior to initiation of the text discussion; and providing for different roles different predefined guidance for the real-time discussion between the participants without providing explicit text of the real-time discussion.

10. The method of claim 9 further comprising obtaining plural scene advance indications by which plural ones of the discussion participants indicate advancement from one scene to another.

11. The method of claim 10 in which scene advance indications are obtained from plural specified discussion participants, the specified participants being fewer than all the participants in the discussion.

12. The method of claim 9 further comprising providing to one or more potential participants a script introduction describing the discussion prior to the potential participants entering the discussion.

* * * * *